Dec. 7, 1965  J. R. ST. AMANT  3,221,435
FISHING LURE
Filed Jan. 30, 1964

INVENTOR.
John R. St. Amant
BY
Barnard, McGlynn & Reising
ATTORNEYS

3,221,435
FISHING LURE
John R. St. Amant, 15 Gage St., Pontiac, Mich.
Filed Jan. 30, 1964, Ser. No. 341,303
15 Claims. (Cl. 43—42.06)

This invention relates to fishing lures and more particularly to an artificial lure of the sheet metal type.

In the design and manufacture of artificial fishing lures, there are several prerequisites that must be met in order to have a successful lure. First of these, of course, is that the lure must be of a size, type, and color to attract the attention of the fish. The motion of the lure through the water contributes greatly to attracting the attention of the fish, through either visual or audible means; and to accomplish this, lures are generally constructed to move in such a manner as is thought to simulate the motion of a minnow or other bait fish, and/or to create an audible signal as it passes through the water. Additionally, the motion must be such as to be fairly regular so that the attracted fish will know where and when to strike the lure in its path.

Generally speaking, fishing lures must be strong and sturdy in construction so as not to be damaged by large fish or by rocks, logs, or other obstructions which they might encounter as they are pulled through the water. At the same time, such lures must be relatively inexpensive to manufacture on a production basis.

It is here proposed to provide a fishing lure of the spoon type, adapted to be drawn through the water with a slipping motion so that, being brightly colored or shiny, the reflection of light therefrom will attract the fish. The lure includes a body portion having variously arcuately curved sections, and a longitudinal impression extending upwardly therefrom which serves to maintain the lure in a generally axial path. The body of the lure is curved transversely thereof to provide the desired slipping motion, a motion which might be described as a partial rotation or oscillation about the longitudinal axis of the body of the lure. A gang-type hook may be attached at the rearward end of the lure; and if additional hooks are required or deemed desirable, such may be secured intermediate the ends of the lure at suitable points. The forward and rearward ends of the lure are directed upwardly and outwardly and cooperate with the various arcuate configurations of other sections of the body and maintain the lure in a generally horizontal position as it travels through the water.

A device constructed in this nature meets the desired prerequisites of fishing lures. Such devices may be made of a bright, shiny material which visually attracts the fish it is intended to catch. The lure may be made of sheet metal or the like, which is of sufficient strength and is sturdy in construction; and the formation is such as to be easily formed by stamping wherein all the various curves and bends may be formed in a single stamping operation. Alternatively, the lure may be made of a molded plastic material, so long as it is of sufficient strength and weight. Thus, the lure is extremely inexpensive to manufacture on a production basis.

These and other advantages will become more apparent from the following description and drawing in which.

Figure 1:
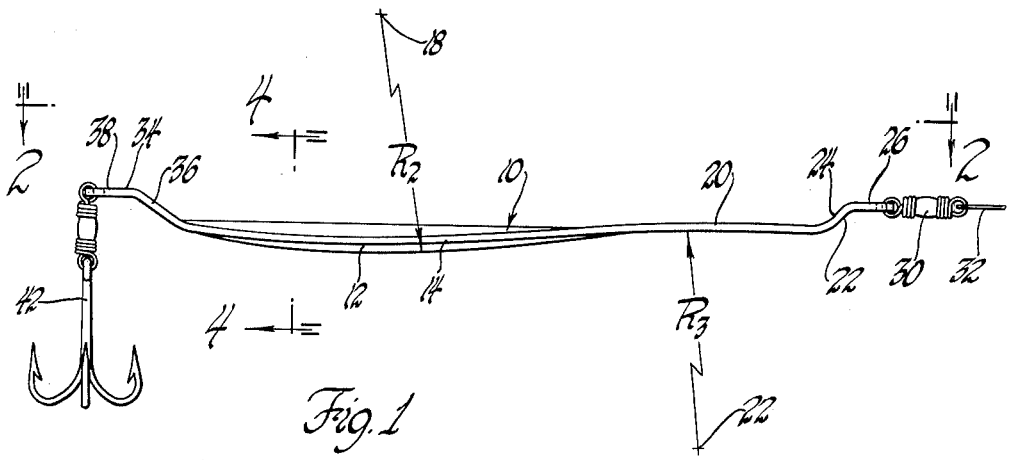
FIGURE 1 is an elevational view of a fishing lure embodying the invention.
Figure 2:
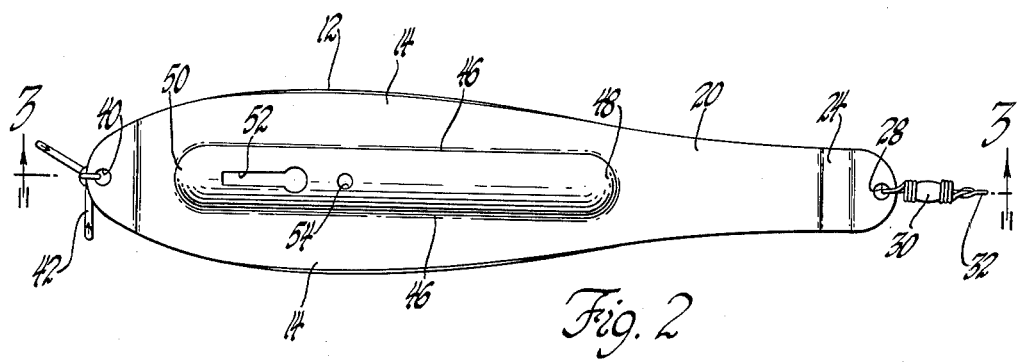
FIGURE 2 is a top plan view of the fishing lure illustrated in FIGURE 1.
Figure 3:
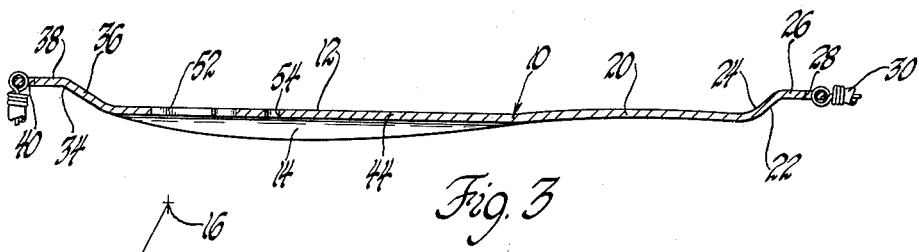
FIGURE 3 is a cross sectional elevational view of the fishing lure of FIGURES 1 and 2 taken substantially along the line 3—3 of FIGURE 2 and looking in the direction of the arrows.

Referring more particularly to the drawings, FIGURES 1 and 2 best illustrate the overall construction of the fishing lure. The lure is shown to include a generally ovate body, illustrated by the numeral 10, which, for purposes of description, may be described as having four definite sections.

Figure 4:
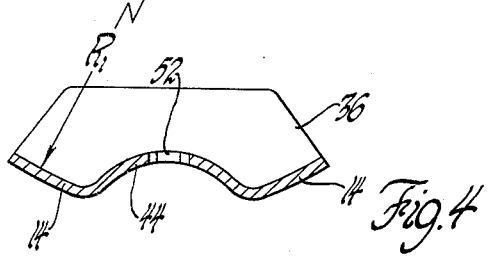
FIGURE 4 is a transverse cross sectional view of the fishing lure illustrated in FIGURES 1 and 2 taken substantially along the line 4—4 of FIGURE 1 and looking in the direction of the arrows.

The first of these sections is the rearward central section 12 which is of compound curvature. The side walls 14, best illustrated in FIGURE 4, are curved outwardly and upwardly about a center, illustrated at 16 in FIGURE 4, and at a radius $R_1$ from the center 16. The second part of the curvature of body portion 12 is longitudinally of the body 10 and about a center 18, shown in FIGURE 1, and at a radius $R_2$ as shown in FIGURE 1. Center point 18 is disposed above the lure for purposes to become hereinafter more apparent.

The second section of body portion 10 may be referred to as the forward middle section 20 and which is of decreasing width, as best illustrated in FIGURE 2, relative to the rearward central portion 12. Portion 20 is curved longitudinally of the body 10, having a center of curvature 22 disposed below the body portion 10, as shown in FIGURE 1, the curvature being at a radius $R_3$ from center 22.

Extending forwardly from the body portion 20 is the third body section 22, which is the forward end of the lure. Section 22 is bent angularly upwardly as at 24 and then forwardly as at 26, and a suitable aperture 28 is formed in the extreme forward portion 26 to receive a suitable swivel or the like 30 to which the fishing line 32 is attached.

The fourth section of body 10 is the rearward portion, illustrated by the numeral 34. Rearward portion 34 continues the generally ovate outline of the body portion 12 and includes a first part 36 bent angularly upwardly and a terminal part 38 extending rearwardly. Terminal part 38 is provided with a suitable aperture or the like 40 to receive the usual gang hook 42 in any suitable manner.

Extending longitudinally of the body 10 and in the rearward central portion 12 is an upwardly directed generally cylindrical impression 44, which blends into the side walls 14, as best illustrated in FIGURE 4. The side edges 46 of the impression 44 are generally parallel so that the impression 46 provides a groove on the underside of the body 10 for maintaining the lure in an axial line as it is pulled through the water. The forward end 48 of the impression 44 blends into the forward central section 20 of the body 10, and the rearward end 50 of the impression 44 blends into the upwardly directed portion 36 of the rearward portion 34. Thus, there is a clear groove through the underside of the lure so that water flow maintains the lure in its proper orientation. Disposed in the peak of the impression 44 is an elongate slot 52 which permits water flow therethrough and prevents the water flowing through the impression 44 from raising the lure in the water. Thus, a portion of the water, which in effect is flowing past the lure, is permitted to pass through the slot 52 from the underside of the body 10 to the upper side of the body 10.

Located adjacent the slot 52 and in the peak of impression 44 may be a suitable aperture 54 for receiving another gang hook or the like, such as the one illustrated at 42, if such should be desired. Additionally, if further color is required, it is possible to secure a streamer or the like in the aperture 54 which will flutter as the lure is drawn through the water for additional attractive purposes.

As will now be apparent, whent the lure is pulled through the water, the lure will maintain itself on a generally axial line due to the impression 44 in the rearward central portion 12 of the body 10. At the same time, the dished or arcuate shape of the side walls 14 will cause the lure to rotate or oscillate about the central axis of the impression 44, and the impression prevents the lure from wobbling from side to side in the horizontal plane. The upwardly and forwardly bent front end 22, because of the inclined surface 24, tends to cause the lure to rise as it passes through the water, this motion being counteracted by the curvature about the point 22 below the body 10, and the arcuate curvature of the rearward central portion 12 about its radius above the body portion 10 tends to act in the opposite direction. The upwardly and rearwardly inclined portion 36 of rearward section 34 also tends to drop the rearward portion of the lure as it passes through the water. The overall result of the various inclined surfaces and curvatures is to maintain the lure in a generally horizontal position as it passes through the water so that it will maintain itself at a desired depth in the water in response to the pull of the fishing line 32. Water spilling through the slot 52 also assists in maintaining the lure at the proper or desired level.

The rotating or oscillating motion of the lure about its axis creates a constantly moving light reflection which is attractive to the fish. At the same time, the motion of the lure as it is pulled through the water is substantially regular, that is, it is along a straight line, so that the attracted fish can judge where best to strike the lure without having it suddenly move away from him. The result, of course, is exactly what is desired in the design of the lure.

Certain modifications and alterations to the fishing lure illustrated and described in the foregoing will occur to those having skill in the art after having had reference to the description and drawing. However, it is not intended to limit the invention by the foregoing, but by the scope of the appended claims in which I claim:

1. A fishing lure including a generally spoon shaped body, said body comprising a centrally disposed upwardly directed impression extending at least partially along the length thereof to provide a water flow trough for maintaining straight line movement of said lure, and arcuately upwardly directed side walls extending laterally outwardly from said impression, the portion of said body including said impression being curved longitudinally thereof with the center of curvature being located above said body.

2. A fishing lure including a generally spoon shaped body, said body comprising a centrally disposed upwardly directed impression extending at least partially along the length thereof to provide a water flow trough for maintaining straight line movement of said lure, and arcuately upwardly directed side walls extending laterally outwardly from said impression, the portion of said body forward of said impression being curved longitudinally thereof with the center of curvature located below said body, and the portion of said body including said impression being curved longitudinally thereof with the center of curvature being located above said body.

3. A fishing lure including a stamped sheet metal body, said body comprising a centrally disposed upwardly directed impression extending partially along the length thereof, arcuately upwardly directed side walls adjacent said impression, the forward end of said body being formed upwardly and forwardly thereof and having fish line attaching means therein, the rearward end of said body being formed upwardly and rearwardly and having hook attaching means therein, the portion of said body between said impression and said forward end being curved longitudinally thereof with the center of curvature being located therebelow, the portion of said body adjacent said impression being curved longitudinally thereof with the center of curvature being located thereabove, and said impression having a longitudinally extending slot formed therethrough and in the peak thereof.

4. A fishing lure including a generally symmetrical spoon shaped body, said body comprising a centrally disposed upwardly directed and elongated impression extending longitudinally and at least partially along the length thereof, and arcuately upwardly directed side walls extending laterally outwardly directly from said impression and being substantially co-extensive therewith, said impression providing a water flow trough to maintain axial movement of said lure when pulled through the water.

5. The fishing lure set forth in claim 4 wherein said impression is provided with water passage means therethrough to permit flow from one side of said body to the other.

6. The fishing lure set forth in claim 5 wherein said water passage means is an elongate slot formed in the peak of said impression.

7. A fishing lure including a generally symmetrical spoon shaped body, said body comprising a centrally disposed upwardly directed and elongated impression extending longitudinally at least partially along the length thereof to provide a water flow trough for maintaining straight line movement of said lure, laterally outwardly and arcuately upwardly directed side walls extending directly from said impression and being substantially co-extensive therewith, and the forward end of said body extending upwardly and forwardly to assist in maintaining the axis of said lure in a substantially horizontal position in the water.

8. A fishing lure including a generally symmetrical spoon shaped body, said body comprising an elongated centrally disposed upwardly directed impression extending longitudinally and at least partially along the length thereof to provide a water flow trough for maintaining straight line movement of said lure, laterally outwardly and arcuately upwardly directed side walls extending directly from said impression and being substantially co-extensive therewith, and the rearward end of said body extending upwardly and rearwardly.

9. A fishing lure including a generally symmetrical spoon shaped body, said body comprising an elongated centrally disposed upwardly directed impression extending at least partially along the length thereof to provide a water flow trough for maintaining straight line movement of said lure, laterally outwardly and arcuately upwardly directed side walls extending directly from said impression and being substantially co-extensive therewith, the forward end of said body extending upwardly and forwardly, and the rearward end of said body extending upwardly and rearwardly, said forward end and said rearward end of said body assisting in maintaining the axis of said lure in a substantially horizontal position in the water.

10. The fishing lure set forth in claim 9 wherein said impression is provided with water passage means therethrough to permit flow from one side of said body to the other.

11. The fishing lure set forth in claim 10 wherein said water passage means is an elongate slot formed in the peak of said impression.

12. A fishing lure including a generally symmetrical spoon shaped body, said body comprising an elongated centrally disposed upwardly directed impression extending longitudinally and at least partially along the length thereof to provide a water flow trough for maintaining straight line movement of said lure, and laterally outwardly and arcuately upwardly directed side walls extending directly from said impression and being substantially co-extensive therewith, the portion of said body forward of said impression being curved longitudinally thereof with the center of curvature located below said body, said forward portion assisting in maintaining the axis of said lure substantially horizontal in the water.

13. A fishing lure including a generally symmetrical spoon shaped body, said body comprising an elongated centrally disposed upwardly directed impression extending longitudinally and at least partially along the length thereof to provide a water flow trough for maintaining straight line movement of said lure, and laterally outwardly and arcuately upwardly directed side walls extending directly from said impression and being substantially co-extensive therewith, a portion of said body being arcuately curved longitudinally thereof with the center of curvature disposed below said body, and another portion of said body being curved longitudinally thereof with the center of curvature being disposed above said body.

14. The fishing lure set forth in claim 13 wherein said impression is provided with water passage means therethrough to permit flow from one side of said body to the other.

15. The fishing lure set forth in claim 14 wherein said water passage means is an elongate slot formed in the peak of said impression.

References Cited by the Examiner
UNITED STATES PATENTS

| | | | |
|---|---|---|---|
| 1,209,020 | 12/1916 | Pflueger | 43—42.52 |
| 1,422,457 | 7/1922 | McClanahan | 43—42.06 |
| 1,450,546 | 4/1923 | Hansen | 43—42.5 |
| 1,599,747 | 9/1926 | Dills | 43—42.5 X |
| 2,485,448 | 10/1949 | Kennedy | 43—42.52 X |

FOREIGN PATENTS 513,444  6/1955  Canada.

SAMUEL KOREN, *Primary Examiner.*